Aug. 7, 1923.
C. A. WILKEY
PORTABLE FENCE
Filed March 2, 1922
1,464,305
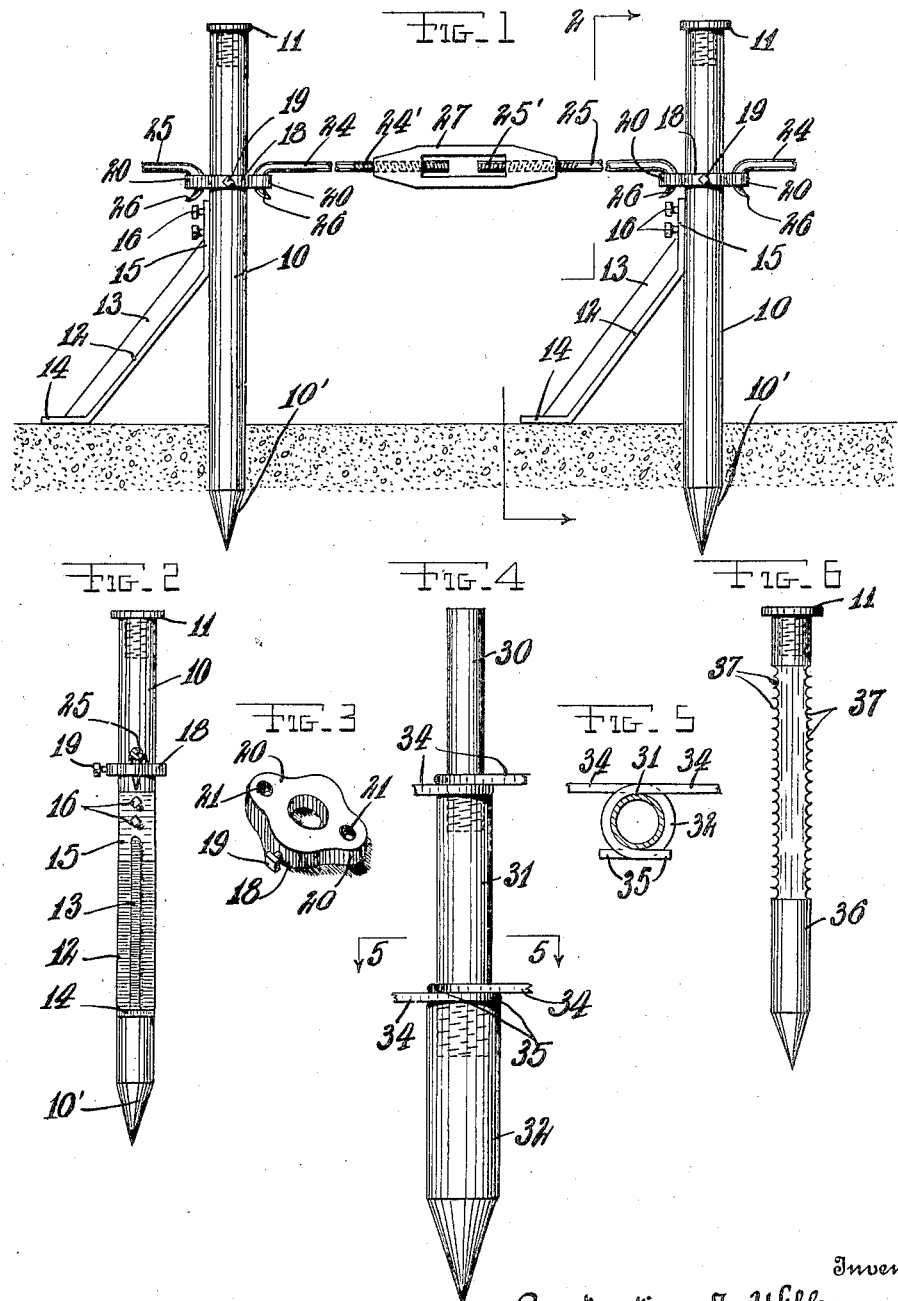
Inventor
Constantine A. Wilkey Patented Aug. 7, 1923.

1,464,305

UNITED STATES PATENT OFFICE.

CONSTANTINE A. WILKEY, OF PERTH AMBOY, NEW JERSEY.

PORTABLE FENCE.

Application filed March 2, 1922. Serial No. 540,414.

*To all whom it may concern:*

Be it known that I, CONSTANTINE A. WILKEY, a citizen of the United States, residing at Perth Amboy, in the county of Middlesex and State of New Jersey, have invented certain new and useful Improvements in Portable Fences, of which the following is a specification.

This invention relates generally to a portable fence, having more particular reference to a portable fence, the invention having for an object to provide a simple construction for such a fence which will permit of its rapid assembly or taking apart.

For further comprehension of the invention, and of the objects and advantages thereof, reference will be had to the following description and accompanying drawings, and to the appended claim in which the various novel features of the invention are more particularly set forth.

Fig. 1 of the drawings is a side view of a section of a portable fence constructed according to my invention.

Fig. 2 is a transverse vertical section on the line 2—2 of Fig. 1.

Fig. 3 is a detail perspective view of the roller which is clamped on the post to receive the ends of the horizontal members.

Fig. 4 is a fragmentary side view showing a modified construction.

Fig. 5 is a horizontal section on the line 5—5 of Fig. 4.

Fig. 6 is a detail elevation of a post which I may substitute for the post shown in Fig. 4, using the same horizontal members.

As shown in Figs. 1 and 2 of the drawings the posts of my improved portable fence comprise galvanized pipes 10 of suitable diameter and having pointed solid lower ends 10' adapted to be driven into the ground, the upper ends of these posts being closed by caps 11. To hold these posts rigidly upright I provide the inclined struts 12 which may be formed of flat strips of metal having longitudinal reinforcing ribs 13 formed therein. These strips are formed at their lower ends into horizontal feet 14 adapted to rest on the ground, and have vertical upper ends 15 which engage the posts and are secured thereto by screws 16.

To secure the horizontal members of the fence to the posts 10 I slip over the latter the collars 18 which are clamped thereto at the desired height by set screws 19. These collars have integral oppositely extending ears 20 in which are formed apertures 21 to receive the ends of the horizontal members.

The horizontal members of the fence comprise the pairs of alined rods 24 and 25 having hooks 26 and on their removed ends which are inserted into the apertures 21. The adjacent ends of these rods have right and left hand screw threads formed thereon as at 24' and 25' which engage in opposite ends of a turn buckle 27 to tighten up the horizontal members after the latter have been engaged with the collars 18.

As the manner of assembling and taking down my improved fence will be apparent to all those skilled in the art it is not deemed necessary to describe it in detail, it being apparent that the fence can be put up or taken down in a very short space of time, and that it forms a structure of great strength and rigidity.

In the modification shown in Figs. 4 and 5 the post is formed in a number of sections 30, 31 and 32 threaded into one another, the bottom section 32 being pointed to facilitate engaging in the ground. The horizontal members of the fence are in the form of rods 34 having hooked ends 35 which engage around the bottom portions of all but the lower section, each being supported by the top of the section underneath, as will be apparent. These rods are tightened by turn buckles, similarly to the rods 24, 25.

In Fig. 6 I have shown a modified form of post 36 which I may employ with the rods 34 and which is provided on opposite sides with closely spaced indentations 37 to receive the crotch portions of the hooked ends of the rods. The rods may thus be fitted at any point on the post, and it will be apparent that when the turn buckles are tightened the rods will be held against vertical movement.

Having thus described my invention what I claim as new and desire to protect by Letters Patent of the United States is as follows:

A fence comprising posts made up of superposed tubular sections of progressively decreased diameter, the upper sections being screwed into the lower sections, rods having hooked ends engaging around upper ones of said sections and resting on the top of adjacent lower sections, and turnbuckles engaged with said rods.

In testimony whereof I have affixed my signature.

CONSTANTINE A. WILKEY.